United States Patent
Zomorrodi et al.

(10) Patent No.: US 7,193,643 B2
(45) Date of Patent: Mar. 20, 2007

(54) SCAN NON-LINEARITY CORRECTION USING FREQUENCY MODULATION AND SYNCHRONIZATION WITH A MASTER CLOCK

(75) Inventors: Mehrdad Zomorrodi, West Hills, CA (US); Steven A. Buhler, Sunnyvale, CA (US)

(73) Assignee: Xerox Corporation, Stamford, CT (US)

(*) Notice: Subject to any disclaimer, the term of this patent is extended or adjusted under 35 U.S.C. 154(b) by 840 days.

(21) Appl. No.: 10/284,543

(22) Filed: Oct. 30, 2002

(65) Prior Publication Data

US 2004/0085438 A1 May 6, 2004

(51) Int. Cl.
B41J 2/435 (2006.01)
(52) U.S. Cl. ...................................... 347/249
(58) Field of Classification Search ................. 347/229, 347/234–237, 246–250, 254; 708/276; 331/25; 360/51
See application file for complete search history.

(56) References Cited

U.S. PATENT DOCUMENTS

| 4,860,237 A | 8/1989 | Curry | 364/718 |
| 4,935,891 A * | 6/1990 | Curry | 708/276 |
| 5,117,243 A * | 5/1992 | Swanberg et al. | 347/254 |
| 6,016,080 A * | 1/2000 | Zuta et al. | 331/25 |
| 6,590,599 B2 * | 7/2003 | Ema | 347/250 |
| 6,690,525 B2 * | 2/2004 | Ruegg et al. | 360/51 |

FOREIGN PATENT DOCUMENTS

JP 05218855 A * 8/1993

* cited by examiner

Primary Examiner—Hai Pham
(74) Attorney, Agent, or Firm—Oliff & Berridge, PLC

(57) ABSTRACT

An electronic circuit is utilized to correct scan non-linearity of a raster output scanner. The circuit modulates a clock frequency to match a scan linearity error profile. Because it is a separate circuit, the exiting closed-loop clock generator does not need to be modified. The correction circuit synchronizes itself with the clock signal using a counter/subtractor phase detector, which ensures that the phase and frequency of the internal clock matches the phase and frequency of the master.

8 Claims, 2 Drawing Sheets

SCAN NON-LINEARITY CORRECTION USING FREQUENCY MODULATION AND SYNCHRONIZATION WITH A MASTER CLOCK

BACKGROUND

This invention is a circuit for correcting for polygon scan errors in a raster scanner, and more specifically to a circuit for modulating a clock frequency to match a scan linearity error profile to effect scan correction.

An optical scanner may consist of a rotating light deflector which displaces a spot of light across a flat "scan line". "Scan deflectance" is a function which relates the position of the spot on the scan line to the angle of the deflector. Its angular derivative "scan revolvance", relates the change in position of the spot on the scan line to the angle of the deflector. By varying the frequency of the pixel clock, the pixel clock is used to regulate the flow of data into or out of the scanner system.

For the scanning system to function properly, there must be a well defined relationship between the pixel clock frequency and the scan revolvance. For example, if a constant density of information on the scan line is required, then it may be appropriate to use a pixel clock of constant frequency and a constant scan revolvance. Generally, the uncorrected scanner's scan deflectance is non-linear. Therefore, its scan revolvance is not constant. For instance, a typical cause of non-linearity is that the distance of the spot on the scan line to the center of rotation of the deflector increases as the spot moves away from the center of the scan line. Other non-linearities may be caused by the particular design of the scanner system. Since the pixel clock used to regulate the flow of data into or out of the scanner system is generally constant during a scan, efforts have been made to make the scan revolvance constant also. Lenses may be employed to correct for the above-mentioned non-linearity by bending the spot toward the center of the scan line as the spot moves away from the center.

The speed at which the spot moves along the scan line is called "scan velocity". Ideally, scan velocity is proportional to scan revolvance. However, there are several factors which affect the constant of proportionality.

First, a scanning system may employ a series of deflectors, called facets, in a polygonal arrangement to increase the efficiency of the scanner system. Due to manufacturing anomalies, all the facets of the polygon are not necessarily at the same optical distance from the scan line. This means that each facet has its own constant of proportionality relating scan revolvance to scan velocity. This is called "polygon signature". Second, the deflector(s) may not turn at a constant rate. This is called "motor hunt". These system scanning errors may be minimized by either improving the polygon and drive systems, or by varying the clock rate to compensate for the errors.

SUMMARY OF THE INVENTION

According to the present invention, an electronic circuit is provided to correct for scan non-linearity of a raster output scanner. The circuit modulates a clock frequency to match a scan linearity error profile. Because it is a separate circuit, the existing closed-loop clock generator does not need to be modified. The correction circuit synchronizes itself with the clock signal using a counter/subtractor phase detector, which ensures that the phase and frequency of the internal clock matches the phase and frequency of the master.

DESCRIPTION OF THE DRAWINGS

Figure 1:
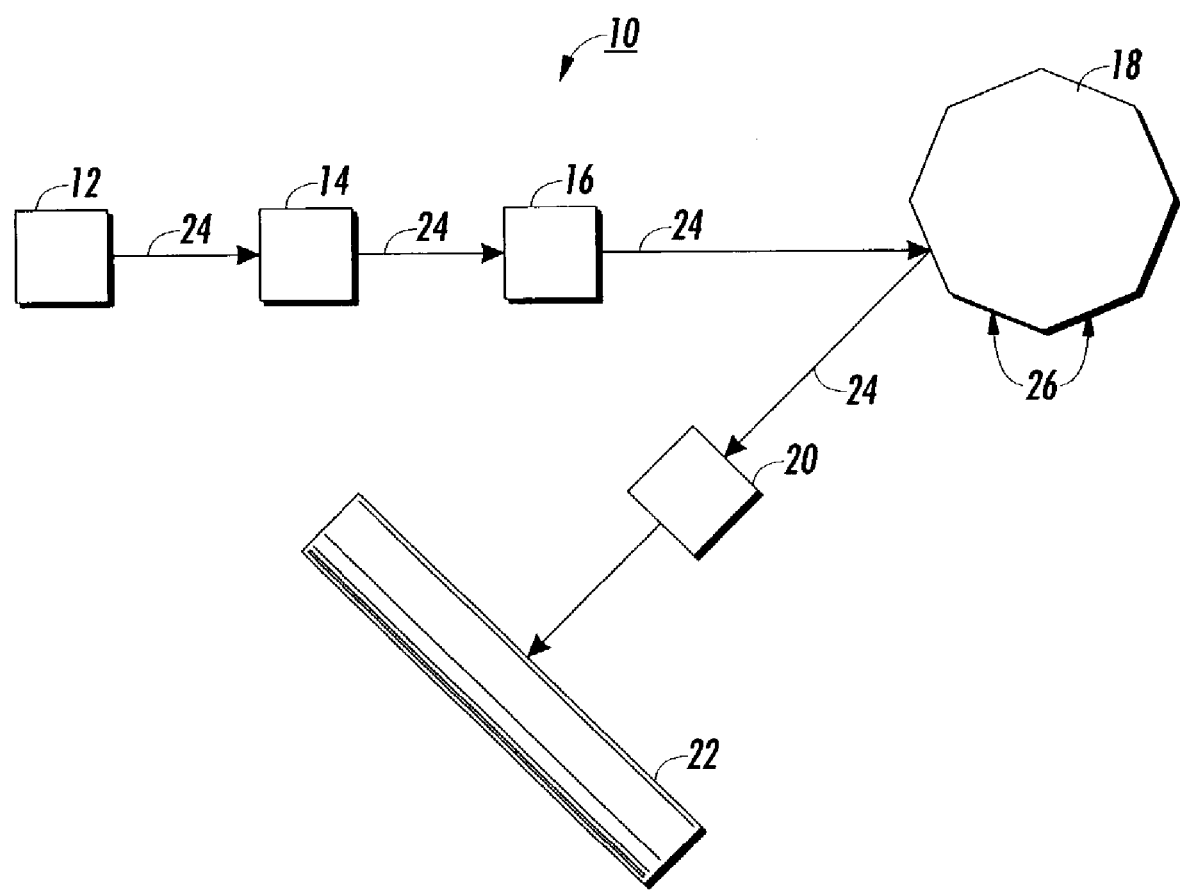
FIG. 1 shows a tangential (fast-scan) view of a raster output scanner of a printing system.

Typically, a color printing system comprises a photoreceptor and four-color stations. Each color station, which is dedicated to a single color, comprises a raster output scanner (ROS). Referring to FIG. 1, there is shown a tangential (fast-scan) view of a typical raster output scanner 10 of a printing system. The raster scanning system 10 utilizes a laser light source 12, a collimator 14, pre-polygon optics 16, a multi-faceted rotating polygon mirror 18 as the scanning element, post polygon optics 20 and a photosensitive medium 22.

The laser light source 12 sends a light beam 24 to the rotating polygon mirror 18 through the collimator 14 and the pre-polygon optics 16. The collimator 14 collimates the light beam 24 and the pre-polygon optics 16 focuses the light beam 24 in the sagittal or cross-scan plane onto the rotating polygon mirror 18. The facets 26 of the rotating polygon mirror 18 reflect the light beam 24 and also cause the reflected light beam to revolve about an axis near the reflection point of the facet 26. It should be noted that the facet may have mirror faces in the range from two to sixteen. The reflected light beam 24 is utilized through the post polygon optics 20 to scan a photosensitive medium 22, such as a xerographic drum (photoreceptor). Since the photoreceptor 22 moves, the light beam 24 scans all the scan lines of a document on the photoreceptor and generates a latent image. Typically, in a color printing system, a latent image is being generated for each basic color and each latent image is being placed over the previous latent images.

After the first latent image has been generated and developed, the modulated light beam from the next ROS will start generating a new latent image over the first latent image. In this manner each one of the following stations generates and develops a latent image over the previous latent images. The process of generating and developing a latent image is repeated four times, each by one of the stations, for four different colors (typically, cyan, yellow, magenta, and black). After the four different color toners are placed over each other, the toners will be transferred onto a sheet of paper.

Since each latent image is being generated over the previous latent image, the placement of each pixel of each latent image over the same pixel of the previous latent image/images is very critical. However, due to the movement of the photoreceptor belt and the tolerances of optical elements of each ROS system, the location of the pixels of each latent image might be slightly different than the location of the pixels of the first latent image. Scan velocity error in a laser scanner is a major contributor to pixel placement errors. One method of correcting these errors in the scanning direction is by using a variable frequency pixel, or clock whose frequency is proportional to the spot scanning velocity. A quality scanning system using such a clock will require high pixel densities, maintained while the clock is rapidly changing frequency. A circuit means of providing the required clock is described herein. By using this circuit to generate a pixel clock which has a frequency that is proportional to a changing scan velocity, a constant pixel density may be maintained. This will enable the simultaneous correction of scan non-linearity.

Typically, there are two sensors placed within a ROS system to detect the start of scan SOS and the end of scan EOS. As the scanning laser light beam passes over a dedicated spot on the scan line immediately prior to pixel placement, the respective sensor generates a start of scan SOS. In the same manner, as the scanning laser light beam passes over a dedicated spot on the scan line immediately after the end of pixel placement, the respective sensor generates an end of scan EOS. The SOS and the EOS are being generated for each scan line. Since the speed of the scanning laser light beam is fixed, the time between the SOS and the EOS is the same for each scan line.

Once scanning of a scan line is started and an SOS signal is generated, the frequency of the master clock has to be varied to correct the scan non-linearity of the pixels of each scan line. The frequency of the master clock will be varied (modulated) based on a predetermined correction curve for each scan line. Correction curves are generated through a test. During the test, when the first image is being generated on the photoreceptor, the placement of the pixels of each scan line is monitored. On the following images, for each scan line, the pixel placements are compared to the pixel placements of the same scan line of the first image and an error signal is being generated. Based on the error signals, correction curves are generated and stored in a look-up table.

Previous electronic solutions for correcting for scan non-linearity employed using an open-loop system with a temperature stable VCO and multiple lookup tables. The VCO is synchronized to SOS and is assumed to have minimal jitter across the entire scan line. The disadvantage of this approach is that there is no adaptive feedback to correct for any error in the VCO frequency. In a single pass full color production printer, due to tighter requirements, it has been determined that this feedback is necessary. Moreover, it would be desirable that the clock generation circuit is left untouched and the corrective adjustments are performed on the stable clock output from this generator. This has two advantages. First, the design is modular. If the clock generation circuit is designed and stabilized, adding a modulator afterwards will not affect its performance. Second, the clock generator can remain closed loop.

Figure 2:
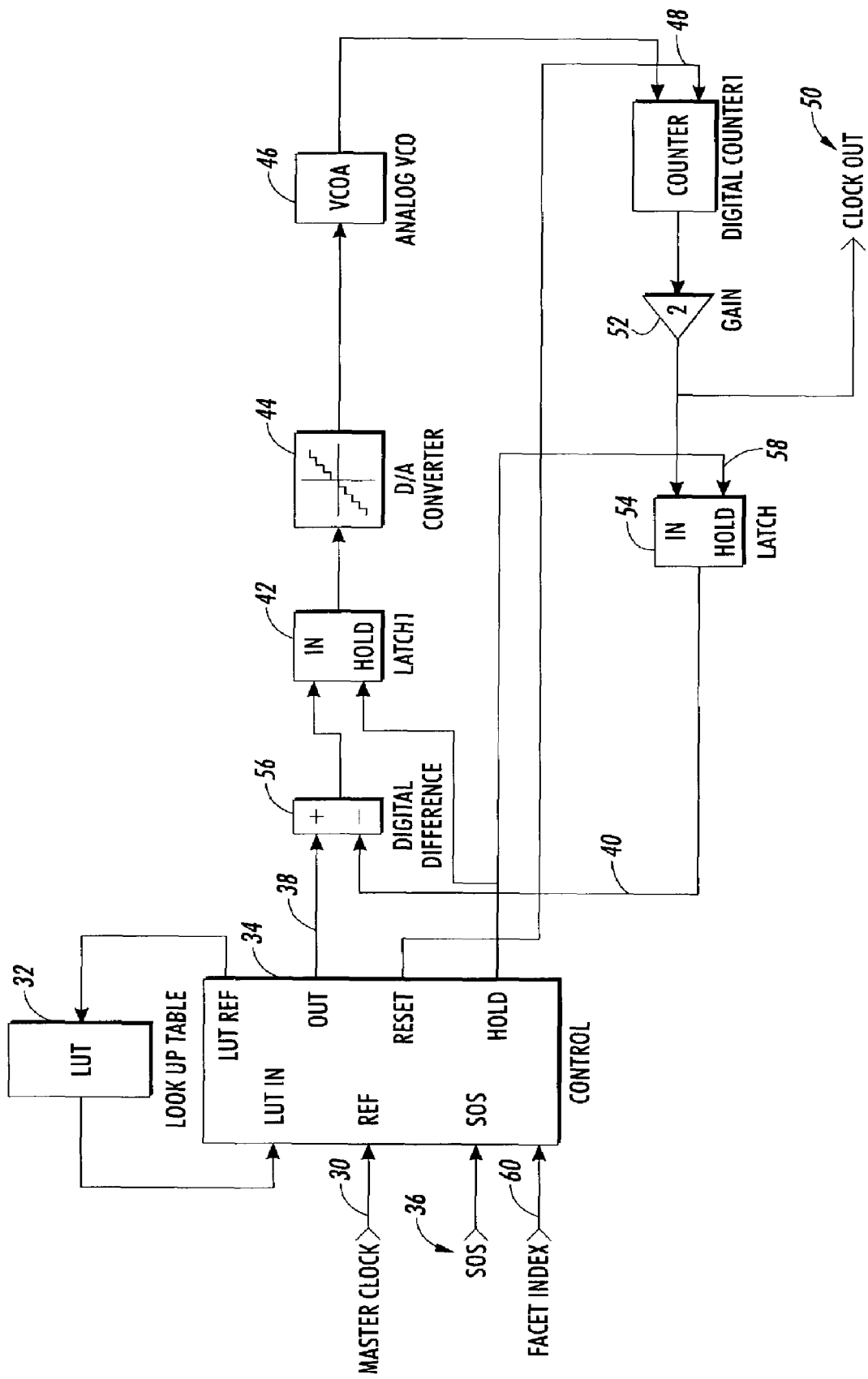
FIG. 2 shows a block diagram of a circuit for correcting for polygon errors in a raster output scanner.

A block diagram for accomplishing these features is shown in FIG. 2. The master clock 30 (from the clock generator) goes to a control circuit 34 which receives a Sync signal generated by the SOS 36. The control circuit 34 synchronizes the master clock 30 with the Sync signal and sends it to an internal counter. The control circuit 34 then counts the number of input pulses and uses this count to address a lookup 32 and to control the latches 42 and 54 respectively. The lookup table 32 values are selected from the facet index 60 (for facets ranging from having two to sixteen mirrors) for choosing calibration values corresponding to the particular type of facet in use. The output of the control circuit 34 is simply the input pulse count multiplied by 8 and the error correction signal for the ROS from the lookup table 32. The value of the output 38 is then compared to the current count 40 from the VCO pulse counter 48 shown in FIG. 2 using a digital subtractor. A counter in the control circuit 34 and the output pulse counter 48 together with the subtractor make up a simple digital phase detector capable of detecting error in phase and frequency of the input and output clocks. Because of the digital nature of the phase detector, the counters have to run at a higher speed in order to detect phase differences between the clocks. Thus, the input count is multiplied by 8 and the VCO 46 runs at 8 times the input clock speed.

The result of this subtraction is held in a latch 42 for 64–128 pixels. The output of the latch goes to a DAC converter 44 which in turns feeds the correct voltage into the VCO 46. The correction circuit 34 synchronizes itself with the clock signal using a counter/subtractor phase detector, which ensures that the phase and frequency of the internal clock 50 matches the phase and frequency of the master clock 30. The circuit modulates a clock frequency to match a scan linearity error profile. Because it is a separate circuit, the exiting closed-loop clock generator does not need to be modified.

It should be also be noted that numerous changes in details of construction and the combination and arrangement of elements may be resorted to without departing from the true spirit and scope of the invention as hereinafter claimed

What is claimed is:

1. An electronic circuit for correcting scan non-linearity of a raster output scanner comprising:
    a control circuit for modulating a clock frequency to match a scan linearity error profile wherein said control circuit synchronizes itself with a clock signal using a counter/subtractor phase detector to match a phase and frequency of an internal clock to a phase and frequency of a master clock;
    said control circuit counting a number of input pulses and using this count to address a lookup table and to control a plurality of latches;
    said control circuit providing an output value, defined by said input pulse count multiplied by 8 and an error correction signal from said lookup table;
    said output value compared to a current count from a VCO pulse counter using a digital subtractor,
    a digital phase detector capable of detecting error in phase and frequency of both input and output clocks; and
    a counter in the control circuit and an output pulse counter together with the subtractor making up said digital phase detector; said counters running at a higher speed in order to detect phase differences between said clocks.

2. The electronic circuit for correcting scan non-linearity according to claim 1, further comprising:
    said input count is multiplied by a value of eight wherein said VCO runs at eight times said input clock speed.

3. The electronic circuit for correcting scan non-linearity according to claim 2, further comprising:
    said subtraction is held in a latch for 64–128 pixels.

4. The electronic circuit for correcting scan non-linearity according to claim 3, further comprising:
    tput of a latch goes to a DAC converter which in turns feeds a correct voltage into said VCO.

5. A method for correcting scan non-linearity of a raster output scanner comprising:
    modulating a pixel clock frequency to match a scan linearity error profile; and synchronizing a clock signal using a counter/subtractor phase detector to match a phase and frequency of an internal clock to a phase and frequency of a master clock;
    counting a number of input pulses and using this count to address a lookup table to control a plurality of latches;
    providing an output value defined by said input pulse count multiplied by a value of eight and an error correction signal from said lookup table;
    comparing said output value to a current count from a VCO pulse counter using a digital subtractor:

detecting error in phase and frequency of both input and Output clocks;

receiving a facet index to determine values in said lookup table; and counters running counters at a higher speed in order to detect phase differences between said clocks.

6. The method according to claim 5, further comprising:

multiplying said input count by a value of eight wherein said VCO runs at eight times said input clock speed.

7. The method according to claim 5, further comprising:

said subtraction is held in a latch for 64–128 pixels.

8. The method according to claim 5, further comprising:

tput of a latch goes to a DAC converter which in turns feeds a correct voltage into said VCO.

* * * * *